United States Patent
Parcell et al.

(10) Patent No.: US 9,079,128 B2
(45) Date of Patent: Jul. 14, 2015

(54) STRAINER BASKET AND RELATED METHODS OF USE

(75) Inventors: Jason W. Parcell, Winston-Salem, NC (US); Benoit Joseph Renaud, Clemmons, NC (US)

(73) Assignee: Hayward Industries, Inc., Elizabeth, NJ (US)

(*) Notice: Subject to any disclaimer, the term of this patent is extended or adjusted under 35 U.S.C. 154(b) by 671 days.

(21) Appl. No.: 13/316,032

(22) Filed: Dec. 9, 2011

(65) Prior Publication Data

US 2013/0146525 A1    Jun. 13, 2013

(51) Int. Cl.
*B01D 29/35*    (2006.01)

(52) U.S. Cl.
CPC ...................... *B01D 29/35* (2013.01)

(58) Field of Classification Search
CPC ...... B01D 35/02; B01D 35/34; B01D 29/115; B01D 29/0029; B01D 29/0043; B01D 29/118; B01D 29/35
USPC .......... 210/167.1, 416.1, 416.2, 448; 415/121.2
See application file for complete search history.

(56) References Cited

U.S. PATENT DOCUMENTS

| | | | |
|---|---|---|---|
| D131,875 S | 3/1942 | Houston | |
| 2,632,355 A | 3/1953 | Becker | |
| 3,403,718 A | 10/1968 | Hughes | |
| 3,456,549 A | 7/1969 | Horton | |
| 3,468,260 A | 9/1969 | Belden | |
| 3,557,857 A | 1/1971 | Swenson | |
| 3,637,331 A | 1/1972 | Smith et al. | |
| 3,744,635 A | 7/1973 | Horvath | |
| 3,826,589 A | 7/1974 | Frank et al. | |
| 3,920,352 A | 11/1975 | Speck et al. | |
| 3,966,363 A | 6/1976 | Rowley et al. | |
| 4,182,216 A | 1/1980 | DeCaro | |
| D255,480 S | 6/1980 | Zieg | |
| 4,242,064 A | 12/1980 | Uncles | |
| 4,269,557 A | 5/1981 | Kidd | |
| 4,287,067 A | 9/1981 | Dyner | |
| 4,353,846 A | 10/1982 | Mehrens et al. | |

(Continued)

FOREIGN PATENT DOCUMENTS

| | | |
|---|---|---|
| EP | 0499506 | 8/1992 |
| EP | 0601899 | 6/1994 |

(Continued)

OTHER PUBLICATIONS

Sta-Rite Owner's Manual for the Max-E glass II and Dura-Glass II Centrifugal Pumps with Integral Trap (2003) (19 pages).

(Continued)

*Primary Examiner* — Fred Prince
(74) *Attorney, Agent, or Firm* — McCarter & English, LLP

(57) ABSTRACT

Improved strainer members for use with pump assemblies and/or fluid systems (e.g., fluid circulation systems) are provided. The present disclosure provides for advantageous strainer members that strain and/or filter fluids in fluid systems (e.g., recreational bodies of water). More particularly, the present disclosure provides for strainer members (e.g., strainer baskets) that include features that improve performance characteristics. Strainer members with an improved ability to resist degradation of pump hydraulic performance when loaded with debris, and/or an improved ability to remove air pockets trapped under the strainer cover at low flow rates are disclosed.

37 Claims, 13 Drawing Sheets

(56) References Cited

U.S. PATENT DOCUMENTS

| | | | |
|---|---|---|---|
| 4,377,360 A | 3/1983 | Kennedy | |
| 4,473,470 A | 9/1984 | Loutit | |
| 4,629,557 A | 12/1986 | Tobias | |
| 4,699,715 A * | 10/1987 | Lee, II | 210/448 |
| 4,773,823 A | 9/1988 | Pease | |
| 4,783,260 A | 11/1988 | Kurihara | |
| D299,143 S | 12/1988 | Hazlehurst | |
| 4,871,303 A | 10/1989 | Roesler | |
| 4,898,513 A | 2/1990 | Hon | |
| 4,901,926 A | 2/1990 | Klotzbach | |
| 4,934,886 A | 6/1990 | Aikens | |
| 4,967,463 A | 11/1990 | Pratt | |
| 5,012,535 A | 5/1991 | Klotzbach | |
| 5,066,179 A | 11/1991 | Pratt | |
| 5,156,535 A | 10/1992 | Budris et al. | |
| 5,167,041 A | 12/1992 | Burkitt, III | |
| 5,193,977 A | 3/1993 | Dame | |
| 5,199,836 A | 4/1993 | Gogarty | |
| 5,255,398 A | 10/1993 | Flynn et al. | |
| 5,409,606 A | 4/1995 | Spencer | |
| 5,624,559 A | 4/1997 | Levin et al. | |
| 5,742,954 A | 4/1998 | Idland | |
| 5,858,234 A | 1/1999 | Sukun | |
| 5,897,787 A * | 4/1999 | Keller | 210/767 |
| 5,983,416 A | 11/1999 | Idland | |
| D419,567 S | 1/2000 | Weiss | |
| 6,041,453 A | 3/2000 | Barrow et al. | |
| D425,911 S | 5/2000 | Fleischer et al. | |
| 6,149,407 A | 11/2000 | Laing | |
| 6,187,179 B1 | 2/2001 | Mayer et al. | |
| 6,287,466 B1 | 9/2001 | Yassin | |
| D450,106 S | 11/2001 | Herr | |
| D450,327 S | 11/2001 | Mori et al. | |
| 6,379,127 B1 | 4/2002 | Andrews et al. | |
| D466,522 S | 12/2002 | Huang | |
| 6,554,587 B2 | 4/2003 | Paolini et al. | |
| 6,623,245 B2 | 9/2003 | Meza et al. | |
| 6,659,717 B1 | 12/2003 | Kao | |
| 6,716,348 B1 | 4/2004 | Morgan | |
| 6,824,354 B2 | 11/2004 | Laing | |
| 6,866,774 B1 | 3/2005 | Stephenson | |
| D507,579 S | 7/2005 | Rossman et al. | |
| 6,939,463 B2 | 9/2005 | Leaverton | |
| 6,955,637 B1 | 10/2005 | Montano et al. | |
| 6,974,303 B2 | 12/2005 | Wang | |
| 7,001,159 B2 | 2/2006 | Peterson, Jr. et al. | |
| D517,570 S | 3/2006 | Stiles, Jr. et al. | |
| 7,063,791 B2 | 6/2006 | Miner | |
| 7,083,392 B2 | 8/2006 | Meza et al. | |
| D536,705 S | 2/2007 | Griffin et al. | |
| 7,188,378 B2 | 3/2007 | Ryan | |
| 7,191,998 B1 | 3/2007 | Chalberg et al. | |
| 7,203,977 B2 | 4/2007 | Mattson, Jr. et al. | |
| 7,223,337 B1 | 5/2007 | Franzino et al. | |
| D550,805 S | 9/2007 | Hazlehurst | |
| D551,256 S | 9/2007 | Pecca et al. | |
| D557,374 S | 12/2007 | Pecca | |
| 7,316,423 B2 | 1/2008 | Rochelle | |
| 7,334,743 B2 | 2/2008 | Wintering et al. | |
| D568,340 S | 5/2008 | Stiles, Jr. et al. | |
| 7,424,753 B2 | 9/2008 | Gruenwald | |
| 7,454,802 B2 | 11/2008 | Tennant et al. | |
| D588,159 S | 3/2009 | Griffin et al. | |
| D590,842 S | 4/2009 | Clark et al. | |
| 7,531,092 B2 | 5/2009 | Hazlehurst | |
| 7,540,721 B2 | 6/2009 | Liedtke et al. | |
| 7,665,158 B2 | 2/2010 | Castellote | |
| 7,686,587 B2 | 3/2010 | Koehl | |
| 7,686,589 B2 | 3/2010 | Stiles, Jr. et al. | |
| 7,878,766 B2 | 2/2011 | Meza et al. | |
| 8,182,212 B2 | 5/2012 | Parcell | |
| 8,186,517 B2 | 5/2012 | Bowman et al. | |
| 8,297,920 B2 | 10/2012 | Ortiz et al. | |
| 8,734,098 B2 | 5/2014 | Ortiz et al. | |
| 2001/0021613 A1 | 9/2001 | Fadeley et al. | |
| 2003/0017055 A1 | 1/2003 | Fong | |
| 2004/0009075 A1 | 1/2004 | Meza et al. | |
| 2004/0022599 A1 | 2/2004 | Nagayama | |
| 2004/0091373 A1 | 5/2004 | Terry et al. | |
| 2004/0149666 A1 | 8/2004 | Leaverton | |
| 2004/0247411 A1 | 12/2004 | Nagayama | |
| 2005/0019154 A1 | 1/2005 | Dial | |
| 2005/0084401 A1 | 4/2005 | Coray et al. | |
| 2005/0095150 A1 | 5/2005 | Leone et al. | |
| 2005/0100455 A1 | 5/2005 | Tuddenham | |
| 2005/0118039 A1 | 6/2005 | Shorten et al. | |
| 2005/0158194 A1 | 7/2005 | Sloan et al. | |
| 2005/0158195 A1 | 7/2005 | Peterson et al. | |
| 2006/0088423 A1 | 4/2006 | Brunet et al. | |
| 2006/0204367 A1 | 9/2006 | Meza et al. | |
| 2007/0114162 A1 | 5/2007 | Stiles et al. | |
| 2007/0114168 A1 | 5/2007 | Hazlehurt | |
| 2007/0154319 A1 | 7/2007 | Stiles, Jr. et al. | |
| 2007/0154320 A1 | 7/2007 | Stiles, Jr. et al. | |
| 2007/0154321 A1 | 7/2007 | Stiles, Jr. et al. | |
| 2007/0154322 A1 | 7/2007 | Stiles, Jr. et al. | |
| 2007/0154323 A1 | 7/2007 | Stiles, Jr. et al. | |
| 2007/0163929 A1 | 7/2007 | Stiles, Jr. et al. | |
| 2007/0183902 A1 | 8/2007 | Stiles, Jr. et al. | |
| 2007/0286723 A1 | 12/2007 | Ihle et al. | |
| 2008/0086810 A1 | 4/2008 | Le | |
| 2008/0134425 A1 | 6/2008 | Tatum | |
| 2008/0181786 A1 | 7/2008 | Meza et al. | |
| 2008/0181788 A1 | 7/2008 | Meza et al. | |
| 2008/0181790 A1 | 7/2008 | Meza et al. | |
| 2009/0064406 A1 | 3/2009 | Lawyer et al. | |
| 2009/0136363 A1 | 5/2009 | Stiles, Jr. et al. | |
| 2009/0145498 A1 | 6/2009 | Bowman et al. | |
| 2009/0252616 A1 | 10/2009 | Brunet et al. | |
| 2009/0311115 A1 | 12/2009 | Ono et al. | |
| 2009/0320202 A1 | 12/2009 | Lawyer et al. | |
| 2010/0006158 A1 | 1/2010 | Castellote et al. | |
| 2010/0049228 A1 | 2/2010 | Kuehner et al. | |
| 2010/0115715 A1 | 5/2010 | Ortiz et al. | |
| 2010/0146696 A1 | 6/2010 | Campbell et al. | |
| 2010/0183452 A1 | 7/2010 | Bosua | |
| 2010/0247332 A1 | 9/2010 | Stiles, Jr. et al. | |
| 2010/0254825 A1 | 10/2010 | Stiles, Jr. et al. | |
| 2011/0076156 A1 | 3/2011 | Stiles, Jr. et al. | |
| 2011/0286859 A1 | 11/2011 | Ortiz et al. | |

FOREIGN PATENT DOCUMENTS

| | | |
|---|---|---|
| EP | 0657602 | 6/1995 |
| EP | 0674109 | 9/1995 |
| EP | 0971137 | 1/2000 |
| EP | 1267085 | 12/2002 |
| EP | 1262670 | 9/2005 |
| FR | 2672646 | 8/1992 |
| GB | 1590253 | 5/1981 |
| GB | 2199106 | 6/1988 |
| GB | 2352789 | 2/2001 |
| GB | 2361041 | 10/2001 |
| JP | 58211599 | 12/1983 |
| JP | 06341398 | 12/1994 |
| JP | 2000-220622 | 8/2000 |
| JP | 2000-220623 | 8/2000 |
| WO | WO 94/10466 | 5/1994 |
| WO | WO 00/68575 | 11/2000 |

OTHER PUBLICATIONS

Sta-Rite Basket C8-58P (Perspective and Six Orthogonal View Photographs) (2003) (7 pages).

Textron, Inc., Various Textron Busings Printouts from http://www.avdel.textron.com (at least as early as Jan. 2006) (5 pages).

Hayward Buyer's Guide and Parts List, effective Dec. 29, 2003 (4 pages).

Pentair Pool Products, WhisperFlo Pump Owner's Manual, Jun. 5, 2001 (10 pages).

Pentair Pool Products, WhisperFlo XF High Performance Pump (known prior to Dec. 9, 2011) (4 pages).

(56) References Cited

OTHER PUBLICATIONS

Pentair Water Pool and Spa, WhisperFlo XF and Max-E-Pro XF High Performance Pump Installation and User's Guide, Dec. 10, 2010 (20 pages).

Pentair's WhisperFlo Strainer Basket photographs (known prior to Dec. 9, 2011) (14 pages).

Pages from various internet sources printed on Oct. 25, 2005 (17 pages).

* cited by examiner

STRAINER BASKET AND RELATED METHODS OF USE

BACKGROUND

1. Technical Field

The present disclosure generally relates to strainer members that strain and/or filter fluids in fluid systems (e.g., pools, spas, etc.) and, more particularly, to strainer members (e.g., strainer baskets) that include features that improve performance characteristics.

2. Background Art

In general, strainer members for straining/filtering fluids in fluid systems (e.g., residential, industrial and/or commercial systems) are known. For example, it is known in the art to use a pump assembly in connection with a fluid circulation system to move debris-ridden fluid from a reservoir (e.g., a pool, a spa, a whirlpool, etc.), strain the debris from the fluid via a strainer member (e.g., a strainer basket), and circulate the strained water back to the reservoir. See, e.g., U.S. Pat. No. 7,531,092 and U.S. Patent Publication Nos. 2009/0145498 and 2008/0079259, the entire contents of each being hereby incorporated by reference in their entireties.

A flow path is typically provided from the reservoir to the pump assembly, and another flow path is typically provided from the pump assembly to an inlet of the reservoir. In general, the pump assembly includes an impeller (or other motive element), as well as a strainer housing that is adapted to house, contain and/or position the strainer member. The strainer member typically is configured to strain/filter the debris from the fluid before the fluid flows to the impeller. As such, the strainer member generally includes small outlets or apertures that allow for the passage of fluid therethrough, while inhibiting the passage of debris therethrough.

In general, it is desirable to have strainer members that have the ability to substantially resist degradation of pump hydraulic performance when loaded with debris. Moreover, it is typically desirable to have strainer members that have the ability to substantially remove air pockets trapped under the strainer cover (e.g., at low flow rates).

As such, a need remains for systems/designs for strainer members having improved performance characteristics compared to conventional strainer members. These and other inefficiencies and opportunities for improvement are addressed and/or overcome by the systems, assemblies and methods of the present disclosure.

SUMMARY

The present disclosure provides for advantageous strainer members for use with pump assemblies and/or fluid systems (e.g., fluid circulation systems). In general, the improved strainer members strain and/or filter fluids in fluid systems (e.g., recreational bodies of water). More particularly, the present disclosure provides for advantageous systems/designs for strainer members that include features that improve performance characteristics. In exemplary embodiments, the present disclosure provides for strainer members with an improved ability to resist degradation of pump hydraulic performance when loaded with debris, and/or an improved ability to remove air pockets trapped under the strainer cover at low flow rates.

The present disclosure provides for a strainer member for use with a fluid circulation system, including an elongated wall that extends from a top end to a bottom end; an end wall at the bottom end, the elongated wall and the end wall defining a chamber therewithin and having a top side opening at the top end; a plurality of apertures that extend through the elongated wall and the end wall; a fluid inlet opening that extends through the elongated wall; a protruding surface having a right side and a left side, the protruding surface extending inwardly into the chamber from the right and left sides; wherein the right and left sides of the protruding surface each define a curved internal recess within the chamber.

The present disclosure also provides for a strainer member further including a plurality of apertures that extend through the protruding surface; and wherein each curved internal recess is configured and dimensioned to substantially prevent debris from blocking at least a portion of the apertures that extend through the protruding surface. The present disclosure also provides for a strainer member wherein the protruding surface extends inwardly into the chamber from a position at or near the bottom end to a position between the bottom end and the top end.

The present disclosure also provides for a strainer member wherein the elongated surface includes a front side and a rear side; wherein the fluid inlet opening is positioned on the front side; and wherein the right and left sides of the protruding surface are positioned on the rear side.

The present disclosure also provides for a strainer member wherein the fluid inlet opening is formed about a central axis; and wherein the protruding surface extends inwardly into the chamber from a position at or near the bottom end to a position above the central axis and below the top end of the chamber. The present disclosure also provides for a strainer member wherein the protruding surface curves inwardly into the chamber from the right and left sides in an arc-like manner to define an inward curved surface that is partially substantially cylindrical.

The present disclosure also provides for a strainer member wherein the elongated wall is formed about a first longitudinal axis; wherein the protruding surface includes an innermost portion that defines a second longitudinal axis; and wherein the first longitudinal axis is substantially parallel to the second longitudinal axis. The present disclosure also provides for a strainer member wherein the fluid inlet opening is formed about a central axis; wherein the protruding surface includes an innermost portion that defines a longitudinal axis; and wherein the longitudinal axis of the innermost portion substantially intersects the central axis of the fluid inlet opening.

The present disclosure also provides for a strainer member wherein the fluid inlet opening is formed about a central axis; wherein the protruding surface includes an innermost portion that defines a longitudinal axis; and wherein the longitudinal axis of the innermost portion is substantially perpendicular to the central axis of the fluid inlet opening. The present disclosure also provides for a strainer member wherein the protruding surface includes a top surface that extends: (i) inwardly into the chamber, and (ii) downwardly towards the bottom end of the chamber.

The present disclosure also provides for a strainer member wherein the top surface is substantially continuous or solid. The present disclosure also provides for a strainer member wherein the fluid inlet opening is formed about a central axis; and wherein the central axis intersects at least a portion of the top surface. The present disclosure also provides for a strainer member wherein the top surface is substantially planar.

The present disclosure also provides for a strainer member wherein the elongated wall is formed about a central longitudinal axis; and wherein the top surface is angled downwardly towards the bottom end at an angle from about 30° to about 45° relative to the central longitudinal axis. The present disclosure also provides for a strainer member wherein the fluid inlet opening is formed about a central axis; and wherein the top surface is angled downwardly towards the bottom end at an angle from about 45° to about 60° relative to the central axis.

The present disclosure also provides for a strainer member wherein the elongated wall is formed about a central longitudinal axis; and wherein the central longitudinal axis is substantially perpendicular to the central axis of the fluid inlet opening. The present disclosure also provides for a strainer member wherein the top surface is configured and dimensioned to re-direct at least a portion of incoming fluid flow through the fluid inlet opening toward the top end.

The present disclosure also provides for a strainer member for use with a fluid circulation system, including an elongated wall that extends from a top end to a bottom end; an end wall at the bottom end, the elongated wall and the end wall defining a chamber therewithin and having a top side opening at the top end; a plurality of apertures that extend through the elongated wall and the end wall; a fluid inlet opening that extends through the elongated wall; a protruding surface extending inwardly into the chamber, the protruding surface including a top surface that extends: (i) inwardly into the chamber, and (ii) downwardly towards the bottom end of the chamber.

The present disclosure also provides for a strainer member wherein the top surface is substantially continuous or solid. The present disclosure also provides for a strainer member wherein the fluid inlet opening is formed about a central axis; and wherein the central axis intersects at least a portion of the top surface. The present disclosure also provides for a strainer member wherein the top surface is substantially planar.

The present disclosure also provides for a strainer member wherein the elongated wall is formed about a central longitudinal axis; and wherein the top surface is angled downwardly towards the bottom end at an angle from about 30° to about 45° relative to the central longitudinal axis. The present disclosure also provides for a strainer member wherein the fluid inlet opening is formed about a central axis; and wherein the top surface is angled downwardly towards the bottom end at an angle from about 45° to about 60° relative to the central axis.

The present disclosure also provides for a strainer member wherein the elongated wall is formed about a central longitudinal axis; and wherein the central longitudinal axis is substantially perpendicular to the central axis of the fluid inlet opening. The present disclosure also provides for a strainer member wherein the top surface is configured and dimensioned to re-direct at least a portion of incoming fluid flow through the fluid inlet opening toward the top end.

The present disclosure also provides for a strainer member wherein the protruding surface extends inwardly into the chamber from a position at or near the bottom end to a position between the bottom end and the top end. The present disclosure also provides for a strainer member wherein the elongated surface includes a front side and a rear side; wherein the fluid inlet opening is positioned on the front side; and wherein the protruding surface is positioned on the rear side.

The present disclosure also provides for a strainer member for use with a fluid circulation system, including an elongated wall that extends from a top end to a bottom end; an end wall at the bottom end, the elongated wall and the end wall defining a chamber therewithin and having a top side opening at the top end; a plurality of apertures that extend through the elongated wall and the end wall; a fluid inlet opening that extends through the elongated wall; a protruding surface having a right side and a left side, the protruding surface extending inwardly into the chamber from the right and left sides; wherein the right and left sides of the protruding surface each define a curved internal recess within the chamber; wherein the protruding surface curves inwardly into the chamber from the right and left sides in an arc-like manner to define an inward curved surface that is partially substantially cylindrical; wherein each curved internal recess is configured and dimensioned to substantially prevent debris from blocking at least a portion of apertures that extend through the protruding surface; wherein the protruding surface includes a top surface that extends: (i) inwardly into the chamber, and (ii) downwardly towards the bottom end of the chamber; wherein the top surface is substantially continuous or solid; and wherein the top surface is configured and dimensioned to re-direct at least a portion of incoming fluid flow through the fluid inlet opening toward the top end.

Additional advantageous features, functions and applications of the disclosed systems, assemblies and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems, assemblies and methods, reference is made to the appended figures, wherein.

DETAILED DESCRIPTION

Figure 1:
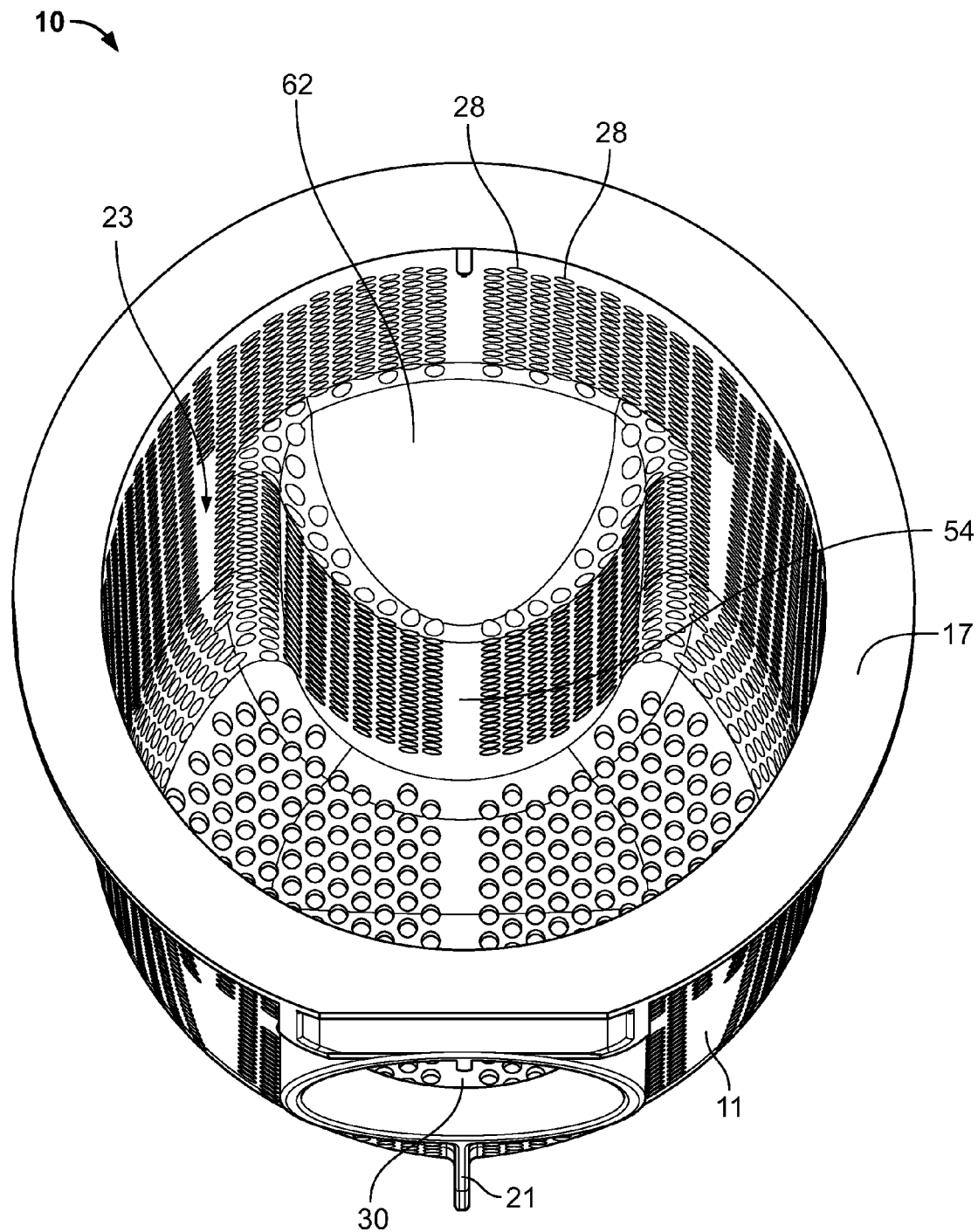
FIGS. 1-3 are top perspective views of a strainer member in accordance with an exemplary embodiment of the present disclosure.
Figure 2:
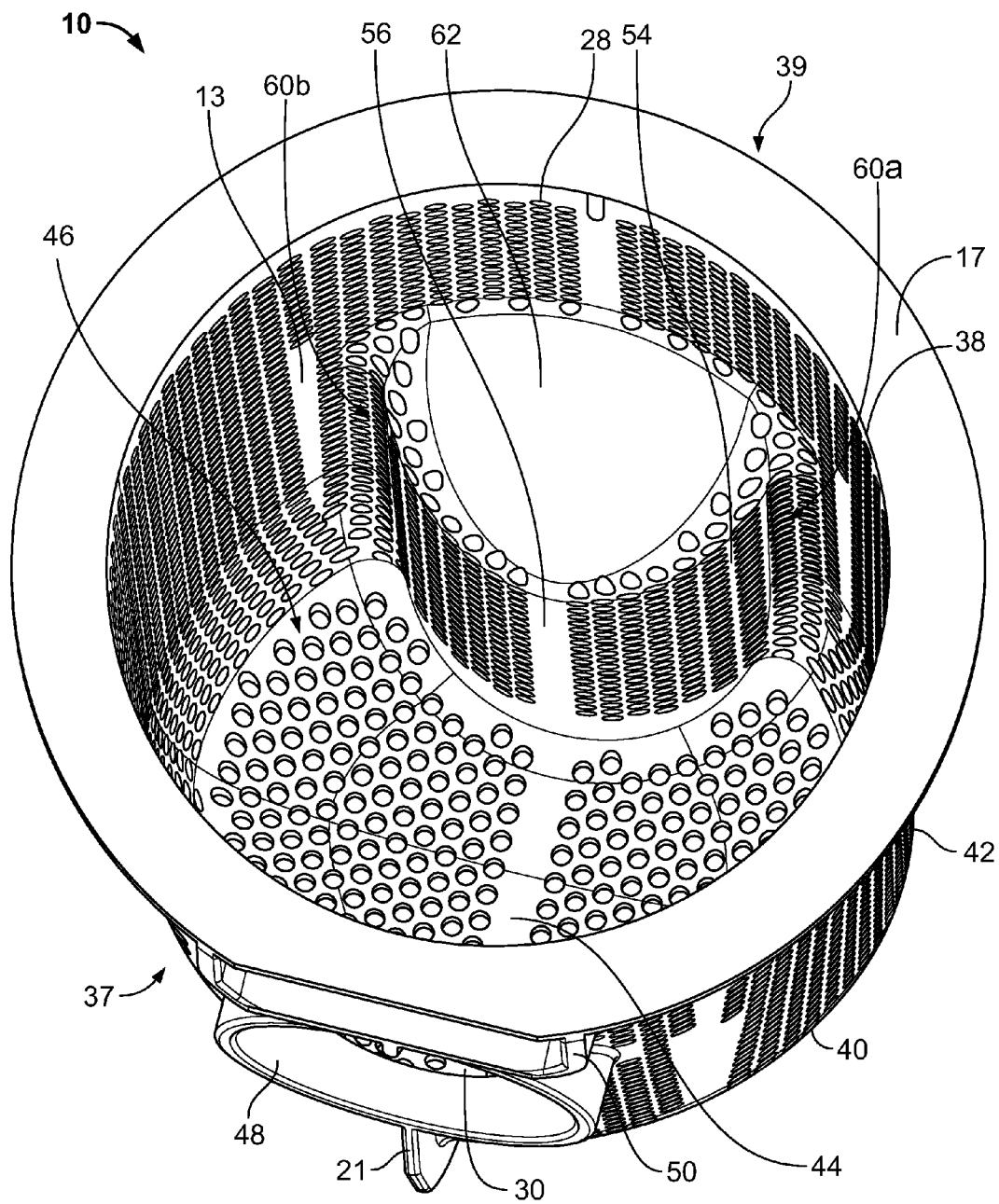
Figure 3:
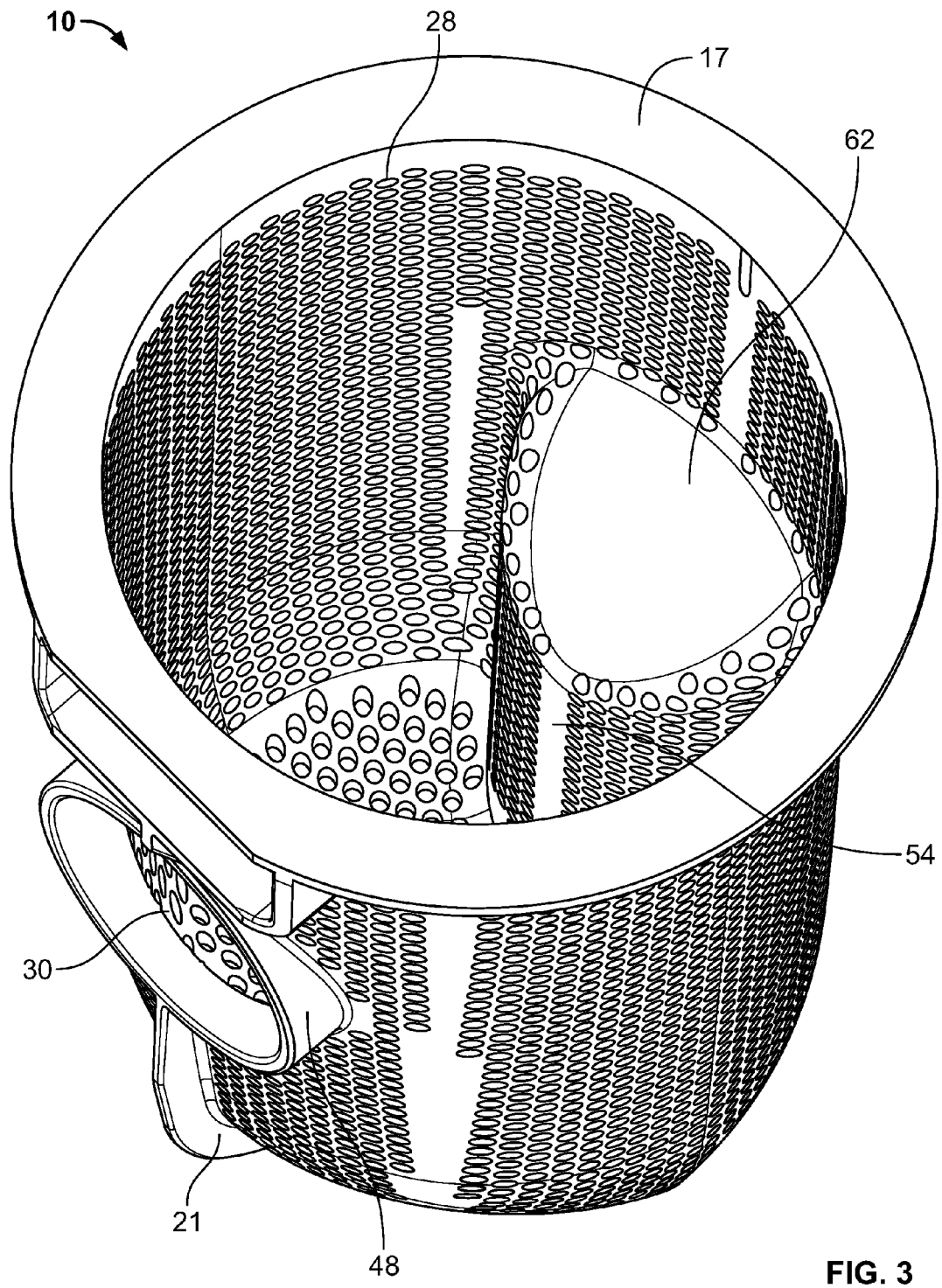
Figure 4:
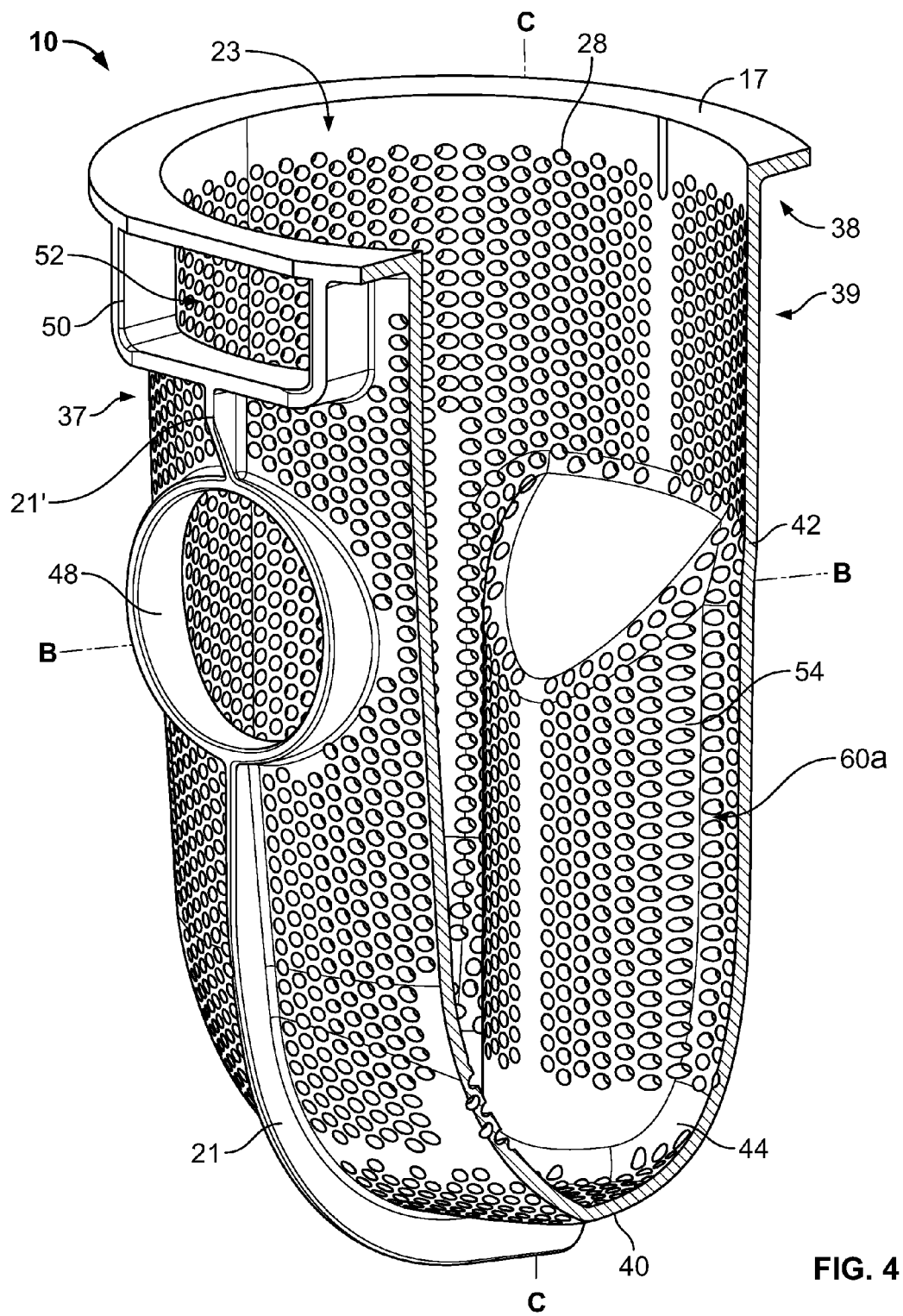
FIG. 4 is a side perspective cross-sectional view of the strainer member of FIG. 1.

In the description which follows, like parts are marked throughout the specification and drawings with the same reference numerals, respectively. Drawing figures are not necessarily to scale and in certain views, parts may have been exaggerated for purposes of clarity.

Strainer members for use with pump assemblies and/or fluid systems (e.g., fluid circulation systems) are disclosed herein. The present disclosure provides for advantageous strainer members that strain and/or filter fluids in fluid systems (e.g., swimming pools, spas, whirlpools, hot tubs, baths and other recreational bodies of water). More particularly, the present disclosure provides for improved, convenient and/or effective systems/designs for strainer members (e.g., strainer baskets) that include features (e.g., a curved surface and/or an angled non-perforated deflector surface) that improve performance characteristics compared to conventional strainer members. In exemplary embodiments, the present disclosure provides for strainer members with an improved ability to resist degradation of pump hydraulic performance when loaded with debris, and/or an improved ability to remove air pockets trapped under the strainer cover at low flow rates.

Current practice provides that when debris collects in some conventional strainer baskets, the debris accumulates in front of the diffuser or impeller opening, which reduces pump hydraulic performance over time. Additionally, some pump designs have a large distance between the pump inlet port and the bottom surface of the strainer cover, thereby creating a dead zone of low velocity under the strainer cover (e.g., at low flow rates). In exemplary embodiments, the present disclosure provides for improved strainer members that include a curved surface and/or an angled non-perforated deflector surface which improve performance characteristics compared to conventional strainer members, thereby providing a significant operational and commercial advantage as a result. For example, the inward curved surface of the exemplary strainer members of the present disclosure will hold the debris a sufficient distance from the diffuser inlet to substantially prevent restrictions to incoming fluid flow that could lead to a reduction in hydraulic performance. Moreover, the angled non-perforated deflector surface of the exemplary strainer members of the present disclosure re-directs incoming fluid flow upwardly towards the inside surface of the strainer cover, which substantially breaks up accumulated air pockets that can develop in this area (e.g., at low flow rates).

Referring now to the drawings, there is illustrated an exemplary strainer member 10. Strainer member 10 typically is formed as an integral unit from a plastic material or the like, although the present disclosure is not limited thereto. Rather, strainer member 10 may take a variety of forms.

Figure 9:
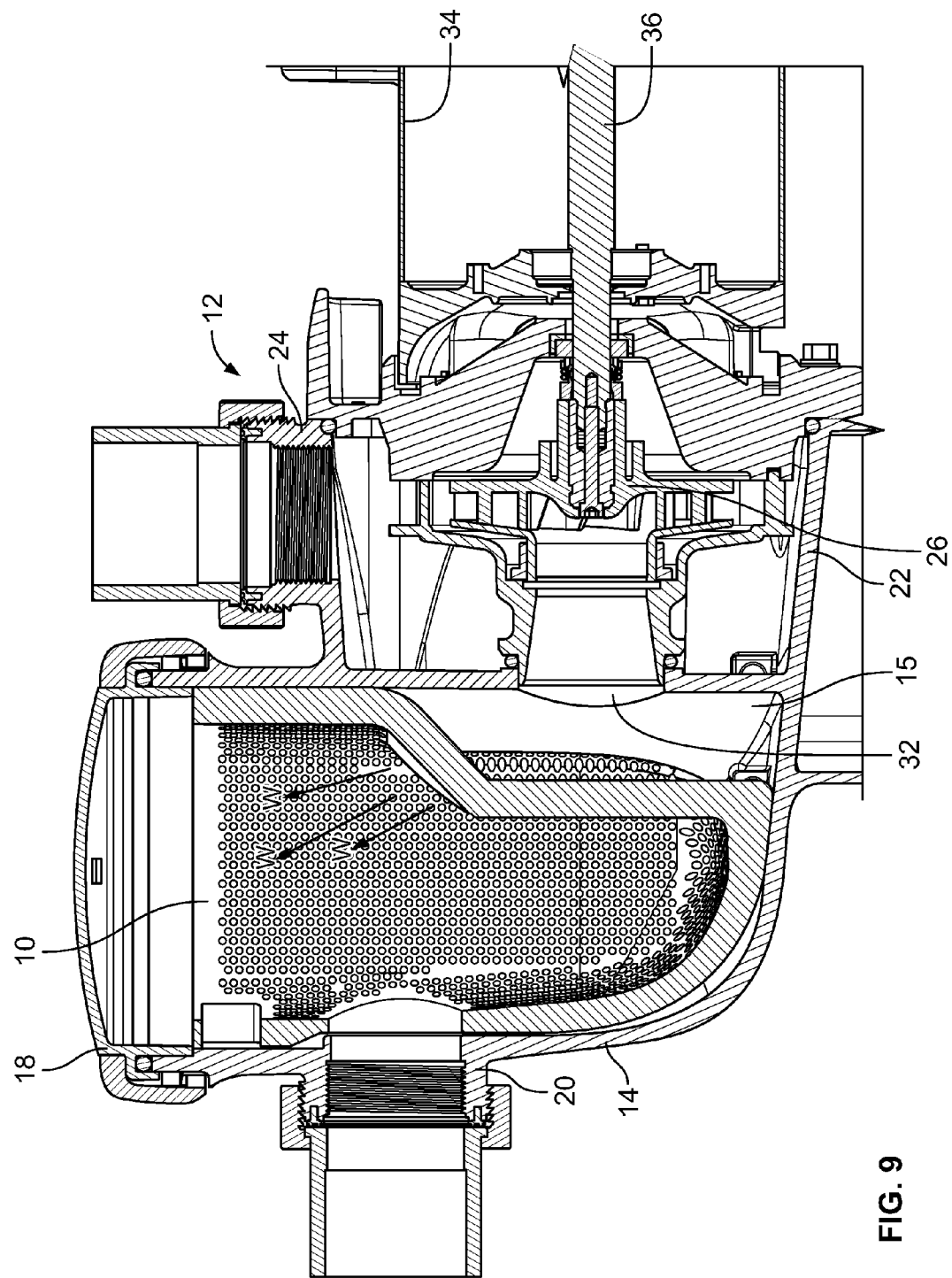
FIG. 9 is a side cross-sectional view of the strainer member of FIG. 1, with the strainer member housed within a strainer housing in accordance with an exemplary embodiment of the present disclosure.
Figure 10:
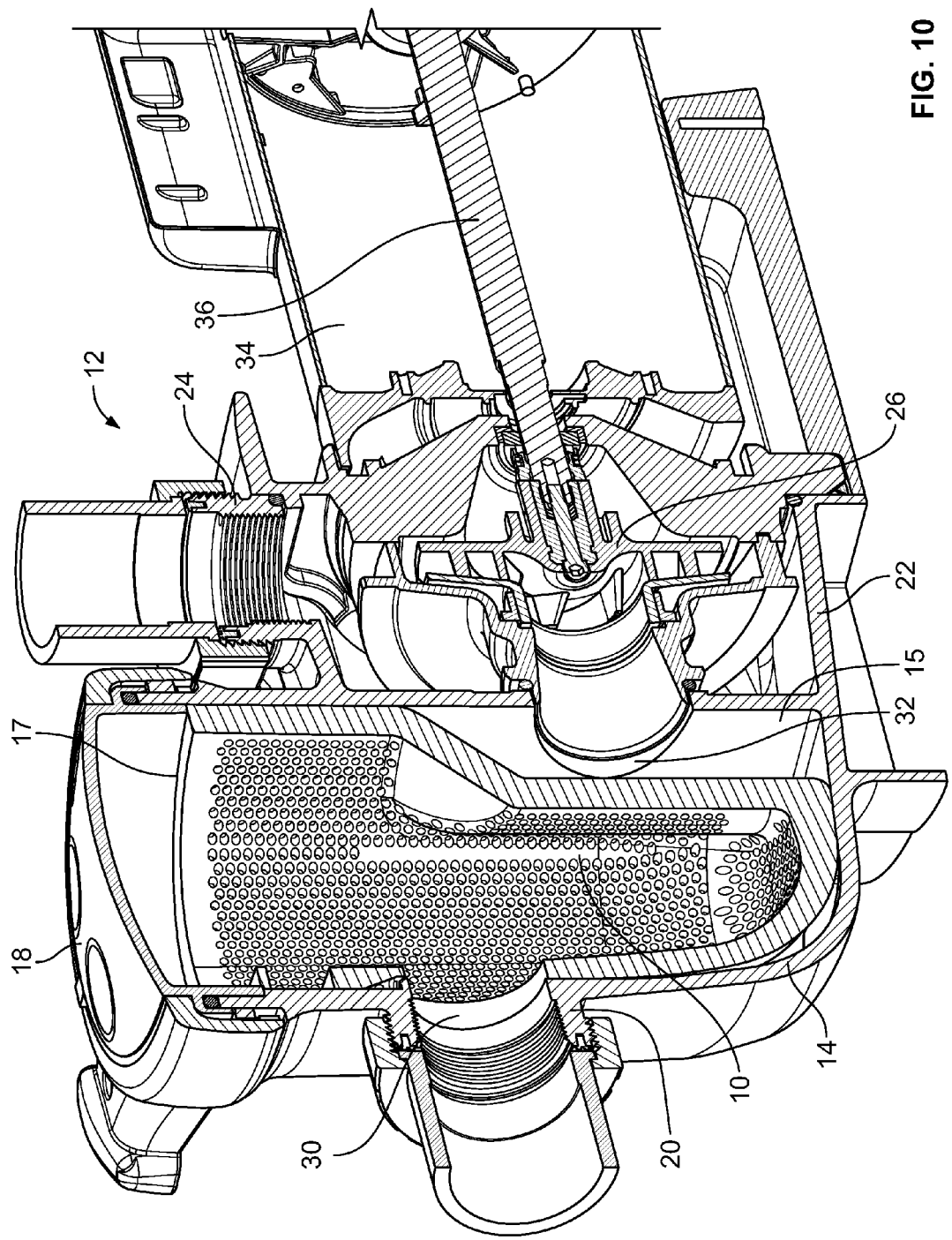
FIG. 10 is a side perspective cross-sectional view of the strainer member and strainer housing of FIG. 9.

In general, strainer member 10 is configured and dimensioned to be utilized in conjunction with pump assemblies and/or fluid systems (e.g., fluid circulation systems) to strain and/or filter fluids in fluid systems (e.g., swimming pools, spas, whirlpools, hot tubs, baths and other recreational bodies of water). For example and as shown in FIGS. 9-10, strainer member 10 may be utilized in conjunction with pump assembly 12, with pump assembly 12 typically including a strainer housing 14 that defines a cavity or internal region for removably receiving/housing strainer member 10.

Strainer member 10 typically includes a plurality of openings or apertures 28 for filtration purposes. The openings 28 allow fluid to pass in and out of strainer member 10, while preventing larger items, such as, for example, sticks, leaves, debris and the like, from passing therethrough. In an alternative embodiment, strainer member 10 may include a plurality of ribs that form a plurality of perforations, as disclosed and described in U.S. Pat. No. 7,531,092. At least a portion of the ribs may be extended internal ribs or fins that are configured and dimensioned to substantially prevent leaves and other debris from blocking the apertures 28 of strainer member 10, as disclosed/described in U.S. Pat. No. 7,531,092.

In exemplary embodiments, strainer member 10 is configured and dimensioned to fit securely within the internal region of strainer housing 14 such that at least a portion of the outer surface 11 of strainer member 10 is stepped away with respect to the inner surface 15 of strainer housing 14 for fluid passage therebetween. For example and as discussed below, strainer member 10 typically includes an outwardly extending flange 17 and at least one outwardly extending fin 21 that are configured and dimensioned to ensure that at least a portion of the outer surface 11 of strainer member 10 is sufficiently spaced away from inner surface 15 of strainer housing 14 to allow for effective fluid movement through the openings 28 of strainer member 10. In one embodiment, at least a portion of fin 21 cooperates with alignment features (not shown) defined on the inner surface 15 of the strainer housing 14 to properly position the strainer member 10 within the strainer housing 14 (e.g., to securely restrain strainer member 10 from unwanted movement during operation of pump assembly 12).

Pump assembly 12 typically includes a strainer housing cover 18 that is adapted to be removably mounted with respect to the strainer housing 14 (e.g., to form a fluid-tight seal with respect to strainer housing 14). In general, a top portion of strainer housing 14 defines an opening that is configured to allow access to the cavity defined therewithin, e.g., to introduce and/or access strainer member 10 positioned in the strainer housing 14. In exemplary embodiments, strainer housing cover 18 defines a substantially circular geometry and is adapted to be removably/detachably mounted with respect to an outer surface of strainer housing 14. For example, cover 18 may be rotatable relative to strainer housing 14, and configured to move/rotate between an open/non-sealed orientation and a closed/sealed orientation. In general, when cover 18 is fully assembled with respect to strainer housing 14, a seal is formed therebetween that substantially prevents fluid leakage and/or pressure loss therefrom.

Strainer housing 14 (FIGS. 9-10) typically includes an inlet 20 formed on a front side of the strainer housing 14 that is configured to allow fluid to enter the strainer housing 14. In exemplary embodiments, an impeller housing 22 cooperates with the strainer housing 14 and generally defines an outlet 24 on a top side or surface thereof. In general, impeller housing 22 is configured and dimensioned to receive and house a rotationally mounted impeller 26. Impeller housing 22 may be integrally formed with respect to the strainer housing 14, although the present disclosure is not limited thereto. Rather, impeller housing 22 may take a variety of forms (e.g., mounted with respect to strainer housing 14, etc.).

In general, strainer member 10 is configured and dimensioned to allow fluid to pass through the strainer housing 14, while preventing items/debris that exceed the dimension of the plurality of openings or apertures 28 of strainer member 10 from passing through to the impeller housing 22. In exemplary embodiments, the strainer member 10 defines an inlet opening 30 formed on a front side 37 thereof. Inlet opening 30 is typically adapted to cooperate with respect to inlet 20 of strainer housing 14, thereby facilitating fluid flow. Inlet 20 of strainer housing 14 typically extends outwardly with respect to strainer housing 14 and includes a plurality of outer and inner threads for secure coupling with respect to typical fluid delivery members such as, for example, a hose, pipe, tube or the like. Strainer member 10 typically defines a top side opening 23 to allow for efficient removal of items that may accumulate within strainer member 10.

During operation of pump assembly 12, fluid (e.g., pool water) passes through inlet 20 and inlet opening 30 and into strainer member 10 that is positioned/housed within strainer housing 14 for straining/filtering purposes. The strained/filtered fluid then passes through outlet opening 32 of strainer housing 14 and into impeller housing 22, where the impeller 26 increases the pressure of the fluid for egress through outlet 24. Similar to outlet 20, outlet 24 typically extends outwardly with respect to strainer housing 14 and includes a plurality of outer and inner threads for secure coupling with respect to typically fluid delivery members (e.g., a hose, pipe, tube or the like). Pump assembly 12 generally works in cooperation with a motor 34 that drives the impeller 26, as is known in the art. For example, the motor typically includes a drive shaft 36 that engages the impeller 26 to impart rotational force thereto.

As shown in FIGS. 1-8, strainer member 10 typically includes a front side 37, a rear side 39, top end 38, a bottom end 40, a substantially cylindrical elongated wall 42 that extends from the top end 38 to the bottom end 40, and a base or end wall 44 at the bottom end 40 of strainer member 10. In general, elongated wall 42 and end wall 44 define a chamber 46 therewithin. Strainer member 10 typically includes a top side opening 23 (e.g., a substantially circular-shaped opening) formed at the top end 38 thereof and having an outwardly extending flange 17 (e.g., annular flange). In exemplary embodiments, strainer member 10 further includes an inlet wall 48, a handle member protuberance 50, and at least one fin 21. Exemplary strainer member 10 takes the form of a single-piece of injection-molded plastic, such that the elongated wall 42, end wall 44, inlet wall 48, flange 17, handle member protuberance 50 and the at least one fin 21 are monolithically formed individually and/or collectively, although the present disclosure is not limited thereto. Rather, it is noted that other suitable means and/or processes known in the art may be used for forming, fabricating and/or assembling the strainer member 10 and/or the components thereof.

Figure 5:
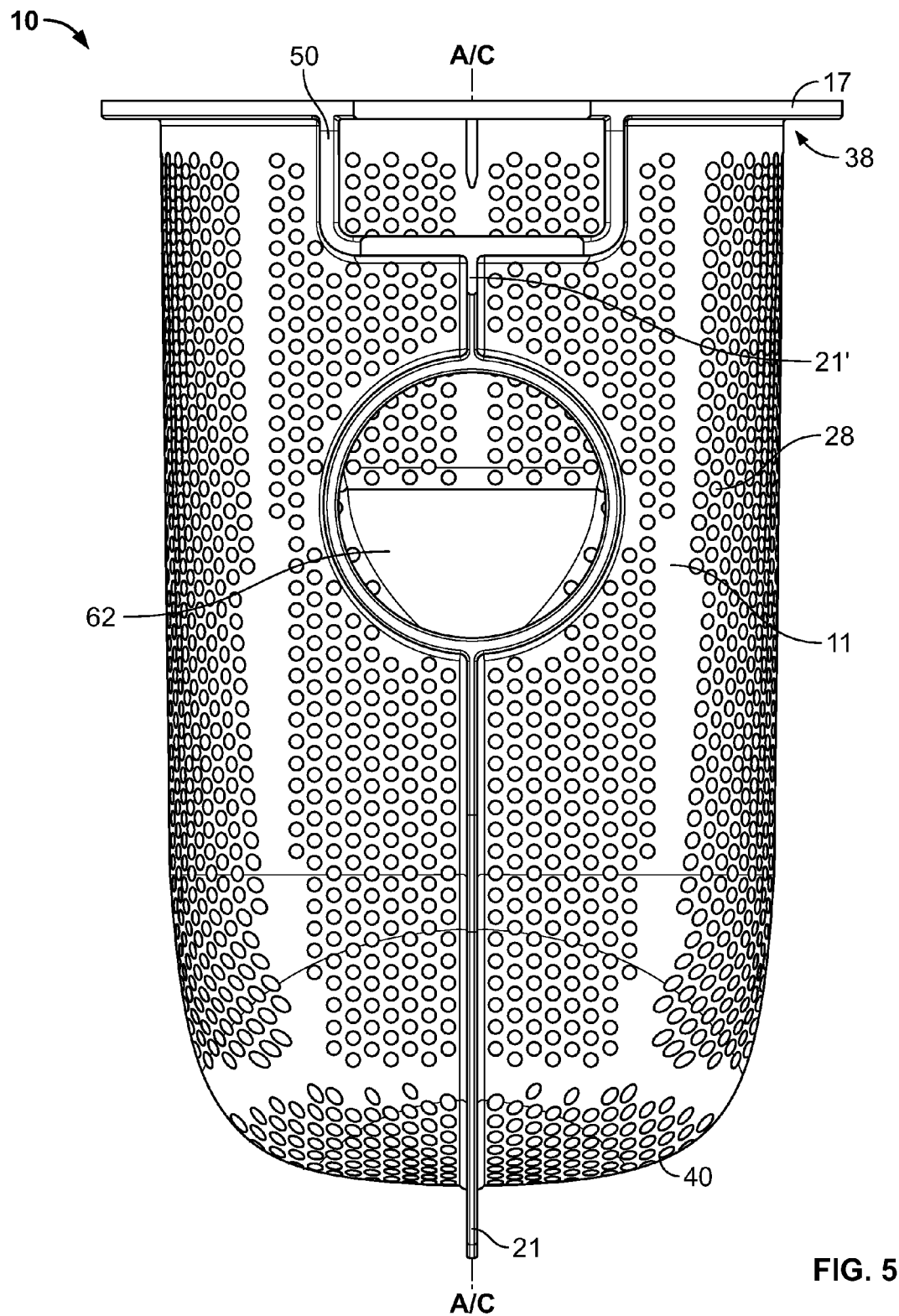
FIG. 5 is a front view of the strainer member of FIG. 1.
Figure 6:
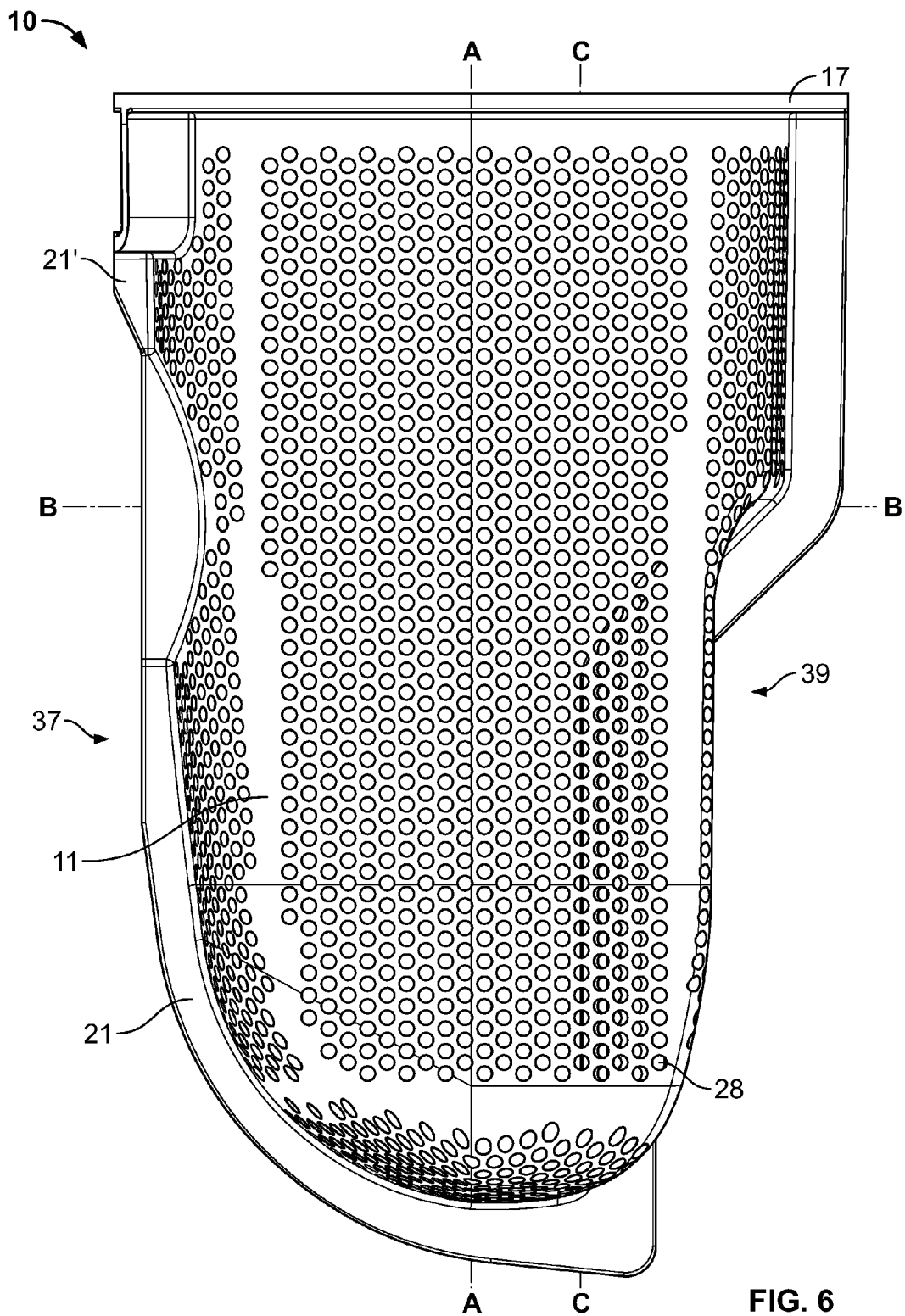
FIG. 6 is a side view of the strainer member of FIG. 1.
Figure 7:
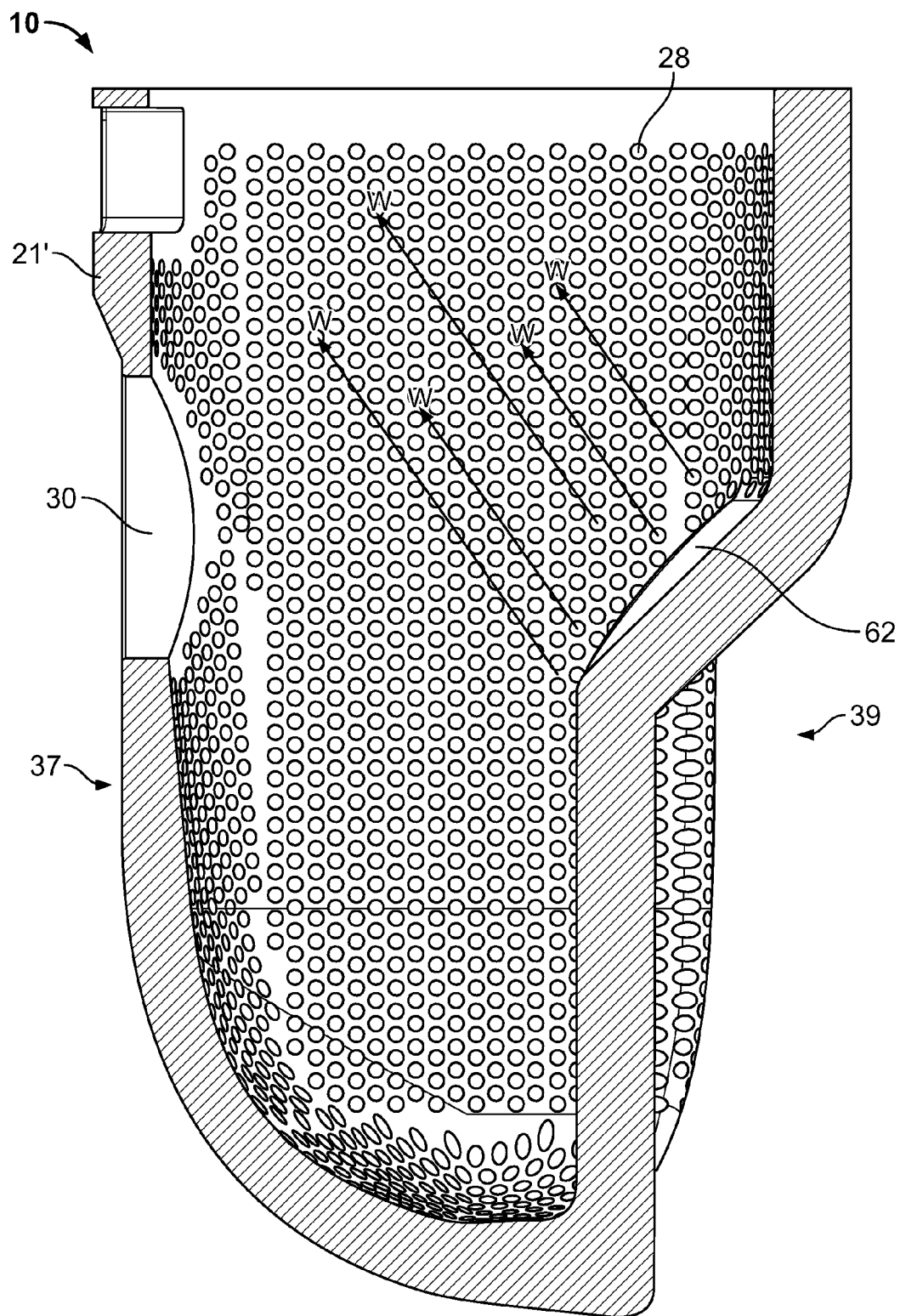
FIG. 7 is a side cross-sectional view of the strainer member of FIG. 1.
Figure 8:
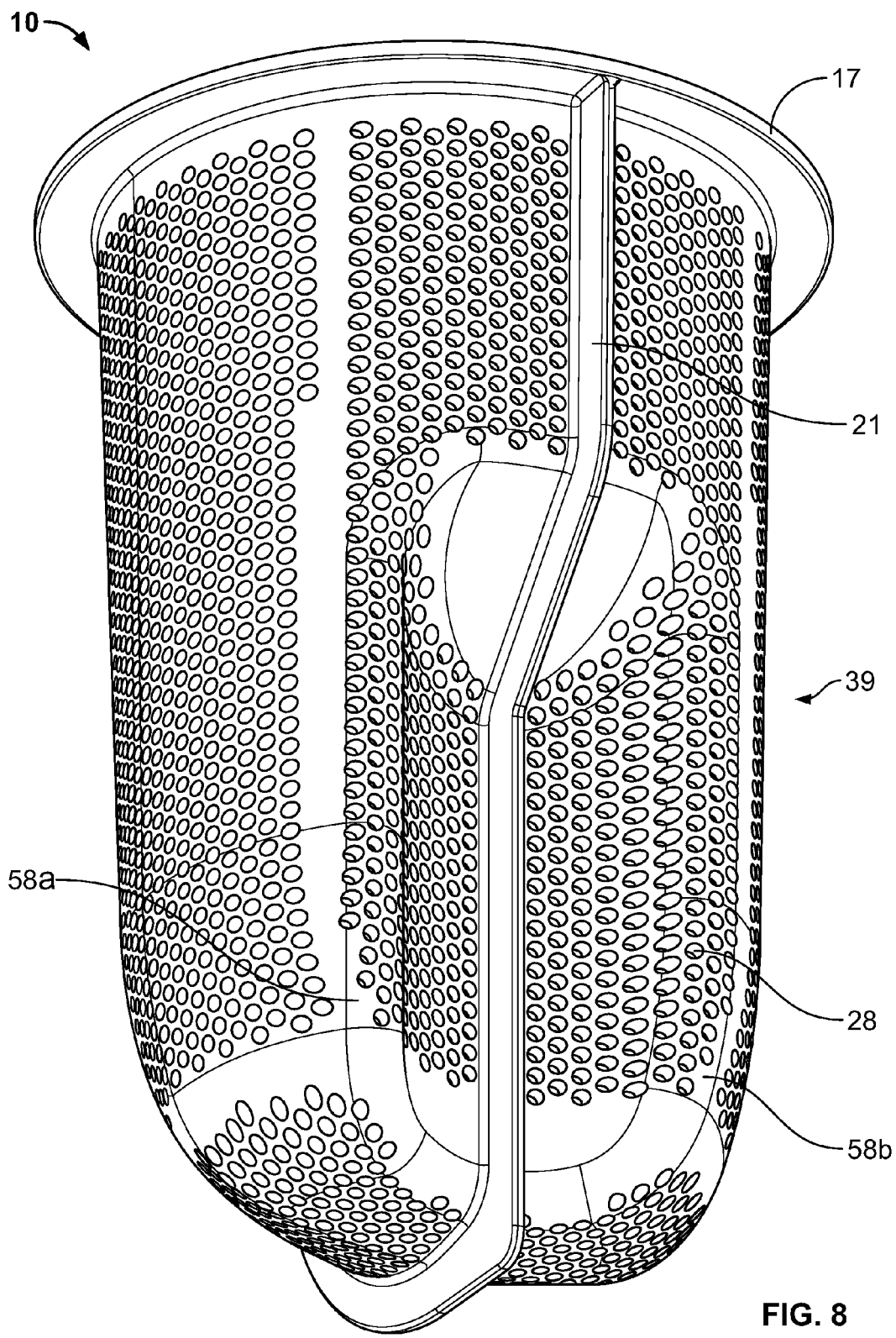
FIG. 8 is a rear perspective view of the strainer member of FIG. 1.

In exemplary embodiments of the present disclosure, the substantially cylindrical elongated wall 42 is formed about a central longitudinal axis A (FIGS. 5-6). Chamber 46 (e.g., elongated wall 42 and end wall 44) typically include a plurality of openings or apertures 28 that extend from an inner surface 13 of the chamber 46 to the outer surface 11 of the chamber 46 for filtration purposes. As noted, strainer member 10 typically defines an inlet opening 30 formed on a front side 37 thereof. In exemplary embodiments, inlet opening 30 extends through the outer and inner surfaces 11, 13 of the elongated wall 42. Inlet wall 48 typically surrounds and/or is positioned around the inlet opening 30, with the inlet wall 48 extending outwardly from the outer surface 11. In general, the inlet wall 48 and/or the inlet opening 30 is formed about a central axis B, with the inlet wall 48 being substantially tubular and having an annular shape, although the present disclosure is not limited thereto. Inlet wall 48 and inlet opening 30 are generally configured and dimensioned to allow the flow of fluid and debris therethrough (e.g., to flow substantially along and/or adjacent to central axis B). As such, inlet wall 48 and inlet opening 30 are typically adapted to cooperate with respect to inlet 20 of strainer housing 14 to facilitate fluid/debris flow.

As shown in FIGS. 1-7, handle member protuberance 50 typically extends from flange 17 and the outer surface 11 to define a handle member. In exemplary embodiments, a substantially rectangular handle opening 52 extends through the substantially rectangular handle member protuberance 50 and the elongated wall 42 to define a user handle, although the present disclosure is not limited thereto. Rather, handle member protuberance 50 may take a variety of forms, shapes, openings and/or recesses.

As noted above, strainer member 10 typically includes at least one outwardly extending fin 21 that is configured and dimensioned to ensure that at least a portion of the outer surface 11 of strainer member 10 is sufficiently spaced away from inner surface 15 of strainer housing 14 to allow for effective fluid movement through the openings 28 of strainer member 10. For example, fin member 21' is formed or positioned on the outer surface 11 of elongated wall 42, is generally straight, and extends from the handle member protuberance 50 to a juncture with the inlet wall 48. Fin member 21 is typically formed or positioned on the outer surface 11 of chamber 46, is generally straight, and extends from a position of about one-hundred-eighty-degrees (180°) about the inlet wall 48 with respect to said juncture of fin 21' with inlet wall 48 and to a position at or near the flange 17 about one-hundred-eighty-degrees (180°) about the flange 17 from the center of the handle member protuberance 50. In other words, fin 21 typically extends from the lower end of the inlet wall 48, down the front side 37 of elongated wall 42, across end wall 44, and up the rear side 39 of elongated wall 42 to a position at or near the flange 17. As noted, at least a portion of fin 21 and/or fin 21' cooperates with alignment features and/or grooves (not shown) defined on the inner surface 15 of the strainer housing 14 to properly position the strainer member 10 within the strainer housing 14 (e.g., to securely restrain strainer member 10 from unwanted movement during operation of pump assembly 12).

As shown in FIGS. 1-10, the rear side 39 of the strainer member 10 typically includes a protruding surface 54 that curves and/or protrudes/extends inwardly into chamber 46. As such and as depicted in FIGS. 9-10, when strainer member 10 is positioned/housed within strainer housing 14, at least a portion of the rear side of protruding surface 54 is positioned in front of and/or adjacent to outlet opening 32 of strainer housing 14 (e.g., at least a portion of the rear side of protruding surface 54 aligns with the outlet opening 32 of strainer housing 14). As such, the inward protruding surface 54 of the strainer member 10 forms a space between the strainer member 10 and the outlet opening 32 of the strainer housing 14, thereby providing an unimpeded fluid flow path into the outlet opening 32 of the strainer housing 14.

Inwardly protruding surface 54 generally extends from the bottom end 40 of strainer member 10 to a position on the rear side 39 of the elongated wall 42 that is between the bottom end 40 and the top end 38, although the present disclosure is not limited thereto. In exemplary embodiments, at least a portion of protruding surface 54 extends from the bottom end 40 to a position above the central axis B of inlet wall 48 (e.g., to a position along rear side 39 of elongated wall 42 that is between the central axis B of inlet wall 48 and the top end 38 of elongated wall 42). It is noted that protruding surface 54 may extend from any position between bottom end 40 and top end 38.

In exemplary embodiments, protruding surface 54 curves and/or protrudes from sides 58a, 58b of the surface 54 inwardly into chamber 46 in an arc-like manner, with the protruding surface 54 defining an inward curved protrusion into chamber 46 that is partially substantially cylindrical. In general, the innermost portion 56 of protruding surface 54 defines a longitudinal axis C. In one embodiment, innermost portion 56 defines longitudinal axis C, with axis C being substantially parallel to central longitudinal axis A of strainer member 10. In exemplary embodiments, longitudinal axis C substantially intersects central axis B of inlet wall 48. In one embodiment, longitudinal axis C is substantially perpendicular to central axis B. In general, exemplary protruding surface 54 is positioned on rear side 39 of strainer member 10 so that at least a portion of surface 54 is substantially aligned with inlet opening 30.

In exemplary embodiments, each side 58a, 58b (e.g., right side 58a and left side 58b) of protruding surface 54 forms or defines a curved internal pocket or recess 60a, 60b within chamber 46. In general, each curved internal pocket 60a, 60b extends from the bottom end 40 of strainer member 10 to a position on the rear side 39 of the elongated wall 42 that is between the bottom end 40 and the top end 38. In exemplary embodiments, each curved internal pocket 60a, 60b extends from the bottom end 40 to a position at or near the central axis B of inlet wall 48. However, it is to be noted that each curved internal pocket 60a, 60b may extend from any position between bottom end 40 and top end 38.

In general, each curved internal pocket 60a, 60b is configured and dimensioned to substantially prevent debris (e.g., leaves) from blocking the openings 28 located on the protruding surface 54 (e.g., openings 28 at or near innermost portion 56 of surface 54) of the strainer member 10, thus advantageously enabling fluid flow therethrough and thereby substantially preventing the outlet opening 32 of the strainer housing 14 from becoming blocked. In other words, the inward protruding surface 54 and/or the pockets 60a, 60b will advantageously direct/hold the debris (e.g., debris will be directed/held at or near pockets 60a, 60b) a sufficient distance from the outlet opening 32 of the strainer housing 14 to substantially prevent restrictions to incoming fluid flow that could lead to a reduction in hydraulic performance.

In exemplary embodiments, the protruding surface 54 includes an angled top surface 62. Angled top surface 62 typically extends: (i) inwardly from the rear side 39 towards the interior of chamber 46 (e.g., towards the innermost portion 56 of protruding surface 54), and (ii) downwardly towards the bottom end 40 of chamber 46.

In general, angled top surface 62 is substantially continuous or solid (e.g., substantially non-perforated). In exemplary embodiments and as shown in FIGS. 1-10, angled top surface 62 is positioned on rear side 39 of strainer member 10 so that central axis B of inlet wall 48 intersects at least a portion of angled top surface 62. Exemplary angled top surface 62 is generally positioned on rear side 39 of strainer member 10 so that at least a portion of surface 62 is substantially aligned with inlet opening 30.

Angled top surface 62 generally defines a substantially planar surface, although it is noted that the outermost edges or portions of the angled top surface may taper or extend downwardly towards the bottom end 40 of chamber 46 at a different angle compared to the substantially planar surface of angled top surface 62.

In exemplary embodiments, top surface 62 is angled downwardly towards the bottom end 40 of chamber 46 at an angle from about 30° to about 45° relative to the central longitudinal axis A of strainer member 10. Top surface 62 may also be angled downwardly towards the bottom end 40 of chamber 46 at an angle from about 45° to about 60° relative to the central axis B of inlet wall 48. In one embodiment, central longitudinal axis A is substantially perpendicular to central axis B, and top surface 62 is angled downwardly towards the bottom end 40 of chamber 46 at an angle from about 30° to about 45° relative to the central longitudinal axis A. So oriented, top surface 62 is angled downwardly towards the bottom end 40 of chamber 46 at an angle from about 45° to about 60° relative to the central axis B of inlet wall 48.

In exemplary embodiments, the substantially continuous or solid (e.g., substantially non-perforated) angled top surface 62 of strainer member 10 increases the fluid velocity below the strainer housing cover 18 (e.g., at low fluid flow rates through inlet 20 of strainer housing 14) by deflecting and/or re-directing at least a portion of the incoming fluid flow through inlet 20 toward the bottom surface of the strainer housing cover 18.

For example, as fluid enters strainer member 10 via inlet 20 and inlet opening 30, a substantial portion of the fluid will travel substantially along and/or adjacent to central axis B towards top surface 62, with the top surface 62 then deflecting and/or re-directing at least a portion of the incoming fluid flow in the multiple directions/paths of arrows W (FIGS. 7 and 9) toward the bottom surface of the strainer housing cover 18, thereby increasing the fluid velocity below the strainer housing cover 18 and substantially breaking-up and/or eliminating undesirable air pockets that may form at or near the bottom surface of the strainer housing cover 18. Stated another way, the angled non-perforated deflector surface 62 of strainer member 10 re-directs incoming fluid flow upwardly towards the inside surface of the strainer cover 18, which substantially breaks up accumulated air pockets that can develop in this area (e.g., at low flow rates).

Figure 11:
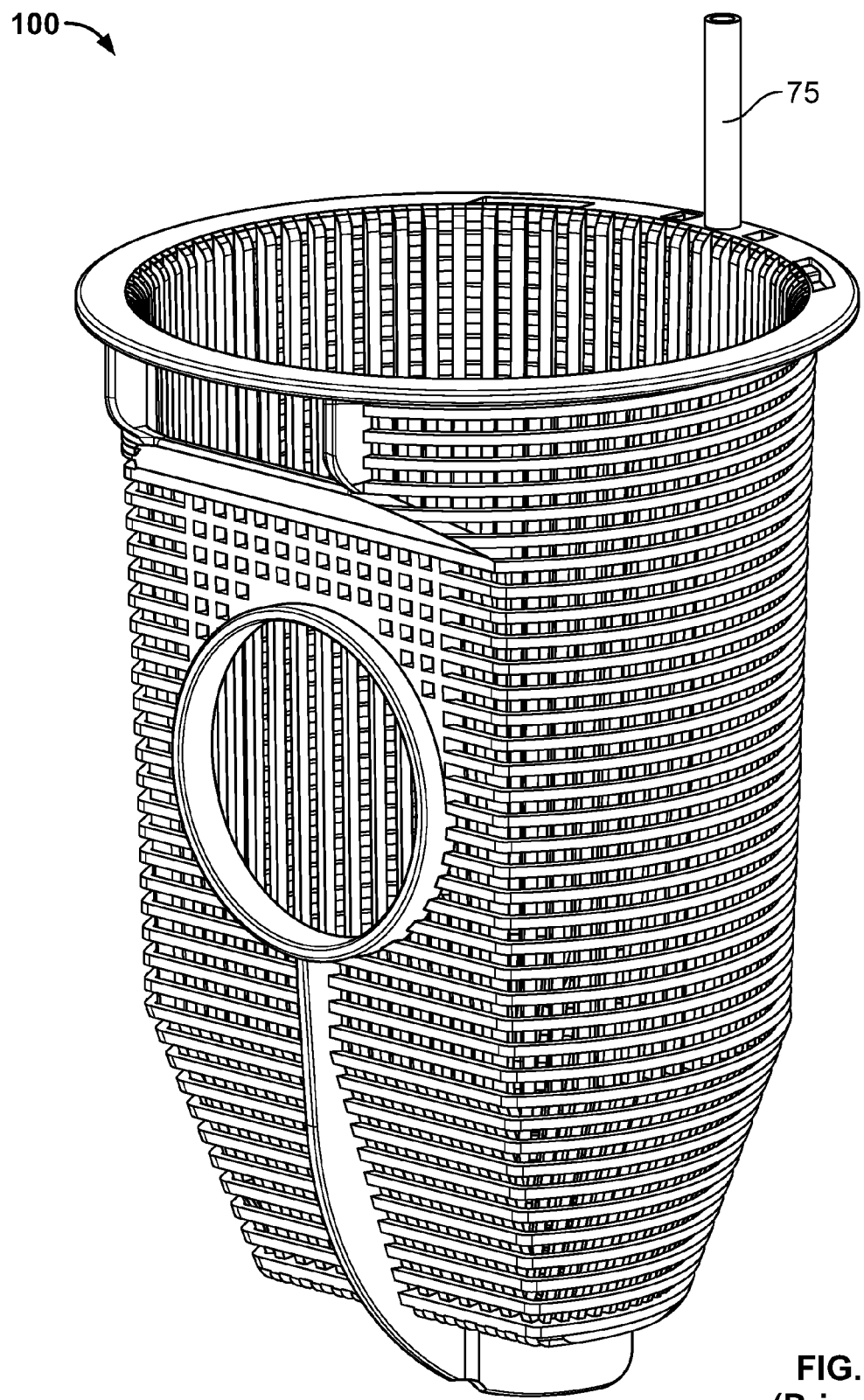
FIG. 11 is a front perspective view of a prior art strainer member.
Figure 12:
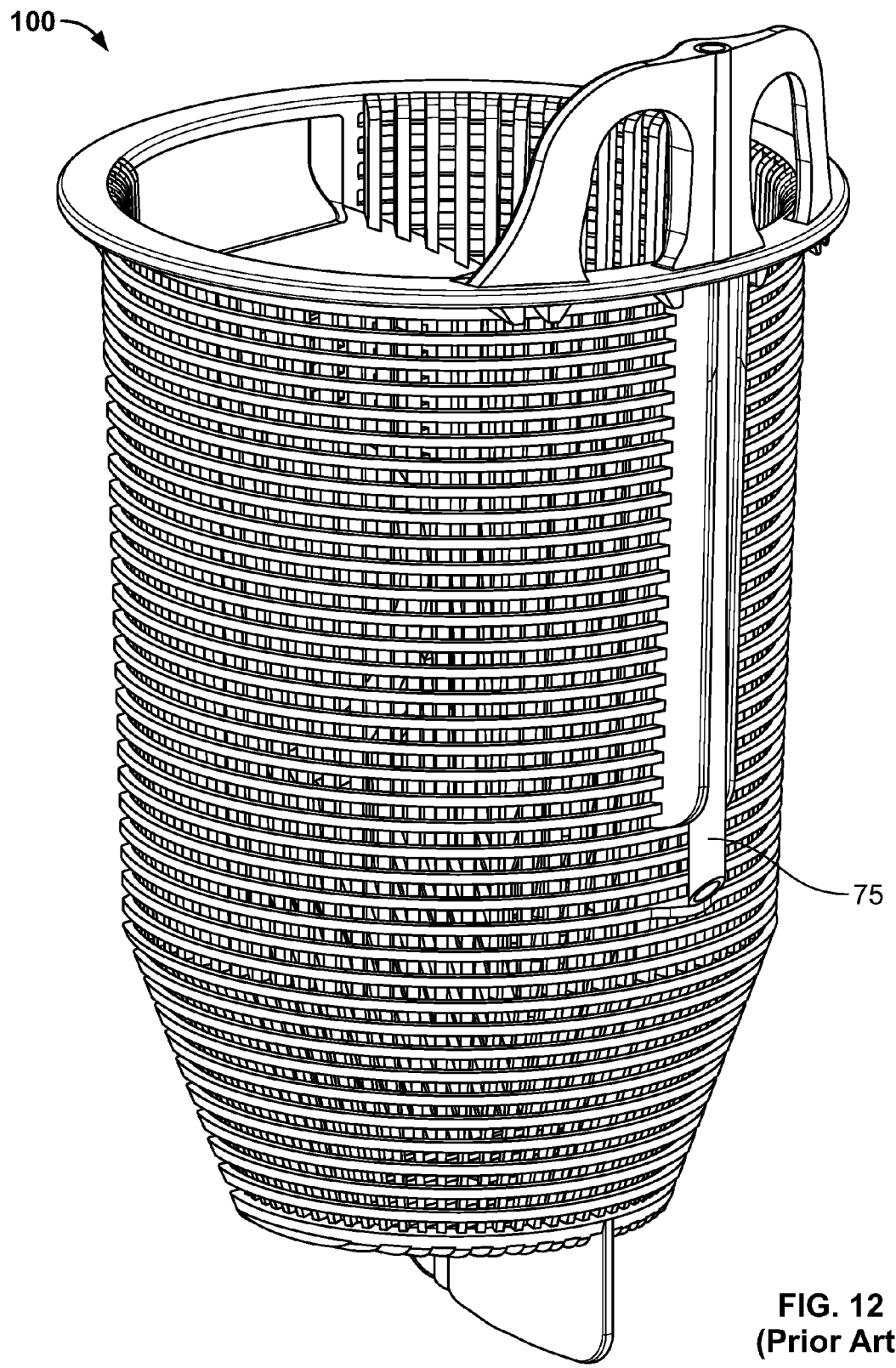
FIG. 12 is a rear perspective view of the strainer member of FIG. 11.
Figure 13:
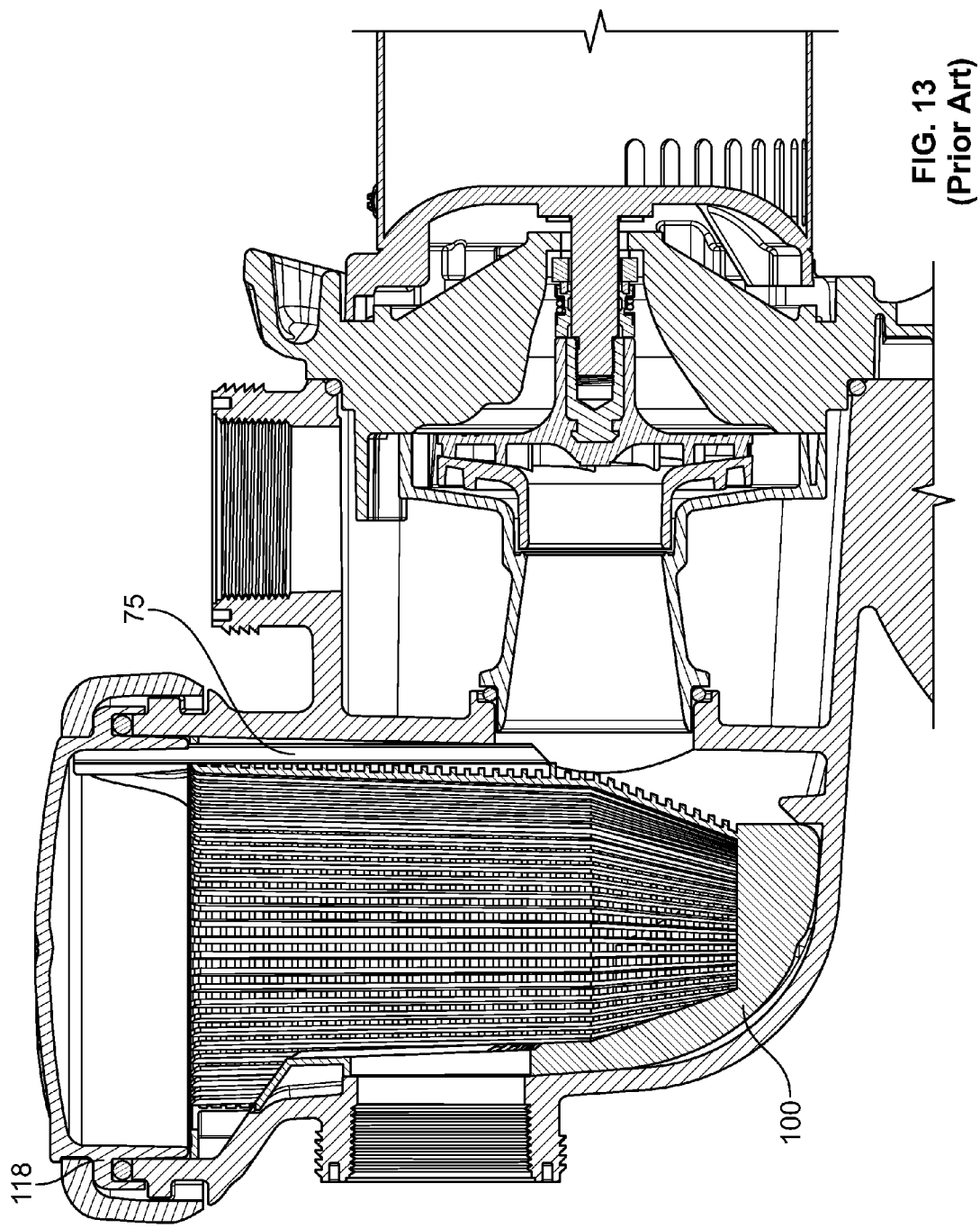
FIG. 13 is a side cross-sectional view of the strainer member of FIG. 11, with the strainer member housed within a strainer housing.

As such, strainer member 10 with angled top surface 62 substantially reduces and/or eliminates the need for a scavenger tube 75, which some conventional strainer members 100 utilize in order to attempt to reduce and/or substantially eliminate undesirable air pockets that may form at or near the bottom surface of the strainer housing cover 118 (FIGS. 11-13). Thus, the exemplary strainer member 10 of the present disclosure having the protruding surface 54 and the angled top surface 62 substantially prevents hydraulic performance degradation as debris accumulates in the strainer member and also ensures that air pockets or the like cannot substantially build-up under the strainer cover 18. However, it is to be noted that strainer member 10 may be utilized in conjunction with scavenger tube 75 or the like, if desired.

Whereas the disclosure has been described principally in connection with fluid circulation systems for swimming pools, spas, whirlpools, hot tubs, baths and other recreational bodies of water, such description has been utilized only for purposes of disclosure and is not intended as limiting the disclosure. To the contrary, it is to be recognized that the strainer members of the present disclosure are capable of use with other fluid systems and/or fluid circulation systems in various commercial, industrial and residential settings.

Thus the present disclosure provides advantageous strainer member designs and assemblies for use in fluid systems (e.g., fluid circulation systems). Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

What is claimed is:

1. A strainer member for use with a fluid circulation system, comprising:
    an elongated wall that extends from a top end to a bottom end;
    an end wall at the bottom end, the elongated wall and the end wall defining a chamber therewithin and having a top side opening at the top end;
    a plurality of apertures that extend through the elongated wall and the end wall;
    a fluid inlet opening that extends through the elongated wall;
    a protruding surface having a right side and a left side, the protruding surface extending inwardly into the chamber from the right and left sides;

a plurality of apertures that extend through the protruding surface;

wherein the right and left sides of the protruding surface each define a curved internal recess within the chamber;

wherein each curved internal recess is configured and dimensioned to substantially prevent debris from blocking at least a portion of the apertures that extend through the protruding surface.

2. The strainer member of claim 1, wherein the protruding surface extends inwardly into the chamber from a position at or near the bottom end to a position between the bottom end and the top end.

3. The strainer member of claim 1, wherein the elongated surface includes a front side and a rear side;

wherein the fluid inlet opening is positioned on the front side; and wherein the right and left sides of the protruding surface are positioned on the rear side.

4. The strainer member of claim 1, wherein the fluid inlet opening is formed about a central axis; and wherein the protruding surface extends inwardly into the chamber from a position at or near the bottom end to a position above the central axis and below the top end of the chamber.

5. The strainer member of claim 1, wherein the protruding surface curves inwardly into the chamber from the right and left sides in an arc-like manner to define an inward curved surface that is partially substantially cylindrical.

6. The strainer member of claim 1, wherein the elongated wall is formed about a first longitudinal axis;

wherein the protruding surface includes an innermost portion that defines a second longitudinal axis; and wherein the first longitudinal axis is substantially parallel to the second longitudinal axis.

7. The strainer member of claim 1, wherein the protruding surface includes a substantially solid top surface that extends: (i) inwardly into the chamber, and (ii) downwardly towards the bottom end of the chamber.

8. A strainer member for use with a fluid circulation system, comprising:

an elongated wall that extends from a top end to a bottom end;

an end wall at the bottom end, the elongated wall and the end wall defining a chamber therewithin and having a top side opening at the top end;

a plurality of apertures that extend through the elongated wall and the end wall;

a fluid inlet opening that extends through the elongated wall;

a protruding surface having a right side and a left side, the protruding surface extending inwardly into the chamber from the right and left sides, wherein the right and left sides of the protruding surface each define a curved internal recess within the chamber;

wherein the fluid inlet opening is formed about a central axis;

wherein the protruding surface includes an innermost portion that defines a longitudinal axis; and wherein the longitudinal axis of the innermost portion substantially intersects the central axis of the fluid inlet opening.

9. The strainer member of claim 8, wherein the protruding surface curves inwardly into the chamber from the right and left sides in an arc-like manner to define an inward curved surface that is partially substantially cylindrical.

10. The strainer member of claim 8, wherein the protruding surface includes a substantially solid top surface that extends: (i) inwardly into the chamber, and (ii) downwardly towards the bottom end of the chamber.

11. A strainer member for use with a fluid circulation system, comprising:

an elongated wall that extends from a top end to a bottom end;

an end wall at the bottom end, the elongated wall and the end wall defining a chamber therewithin and having a top side opening at the top end;

a plurality of apertures that extend through the elongated wall and the end wall;

a fluid inlet opening that extends through the elongated wall;

a protruding surface having a right side and a left side, the protruding surface extending inwardly into the chamber from the right and left sides;

wherein the right and left sides of the protruding surface each define a curved internal recess within the chamber;

wherein the fluid inlet opening is formed about a central axis;

wherein the protruding surface includes an innermost portion that defines a longitudinal axis; and wherein the longitudinal axis of the innermost portion is substantially perpendicular to the central axis of the fluid inlet opening.

12. The strainer member of claim 11, wherein the protruding surface curves inwardly into the chamber from the right and left sides in an arc-like manner to define an inward curved surface that is partially substantially cylindrical.

13. The strainer member of claim 11, wherein the protruding surface includes a substantially solid top surface that extends: (i) inwardly into the chamber, and (ii) downwardly towards the bottom end of the chamber.

14. A strainer member for use with a fluid circulation system, comprising:

an elongated wall that extends from a top end to a bottom end;

an end wall at the bottom end, the elongated wall and the end wall defining a chamber therewithin and having a top side opening at the top end;

a plurality of apertures that extend through the elongated wall and the end wall;

a fluid inlet opening that extends through the elongated wall;

a protruding surface having a right side and a left side, the protruding surface extending inwardly into the chamber from the right and left sides;

wherein the right and left sides of the protruding surface each define a curved internal recess within the chamber;

wherein the protruding surface includes a top surface that extends: (i) inwardly into the chamber, and (ii) downwardly towards the bottom end of the chamber.

15. The strainer member of claim 14, wherein the top surface is substantially continuous or solid.

16. The strainer member of claim 14, wherein the fluid inlet opening is formed about a central axis; and wherein the central axis intersects at least a portion of the top surface.

17. The strainer member of claim 14, wherein the top surface is substantially planar.

18. The strainer member of claim 14, wherein the elongated wall is formed about a central longitudinal axis; and wherein the top surface is angled downwardly towards the bottom end at an angle from about 30° to about 45° relative to the central longitudinal axis.

19. The strainer member of claim 14, wherein the fluid inlet opening is formed about a central axis; and wherein the top surface is angled downwardly towards the bottom end at an angle from about 45° to about 60° relative to the central axis.

20. The strainer member of claim 19, wherein the elongated wall is formed about a central longitudinal axis; and
wherein the central longitudinal axis is substantially perpendicular to the central axis of the fluid inlet opening.

21. The strainer member of claim 14, wherein the top surface is configured and dimensioned to re-direct at least a portion of incoming fluid flow through the fluid inlet opening toward the top end.

22. The strainer member of claim 14, wherein the protruding surface curves inwardly into the chamber from the right and left sides in an arc-like manner to define an inward curved surface that is partially substantially cylindrical.

23. The strainer member of claim 14, wherein the top surface is substantially solid.

24. A strainer member for use with a fluid circulation system, comprising:
an elongated wall that extends from a top end to a bottom end;
an end wall at the bottom end, the elongated wall and the end wall defining a chamber therewithin and having a top side opening at the top end;
a plurality of apertures that extend through the elongated wall and the end wall;
a fluid inlet opening that extends through the elongated wall;
a protruding surface extending inwardly into the chamber, the protruding surface including a top surface that extends: (i) inwardly into the chamber, and (ii) downwardly towards the bottom end of the chamber.

25. The strainer member of claim 24, wherein the top surface is substantially continuous or solid.

26. The strainer member of claim 24, wherein the fluid inlet opening is formed about a central axis; and
wherein the central axis intersects at least a portion of the top surface.

27. The strainer member of claim 24, wherein the top surface is substantially planar.

28. The strainer member of claim 24, wherein the elongated wall is formed about a central longitudinal axis; and
wherein the top surface is angled downwardly towards the bottom end at an angle from about 30° to about 45° relative to the central longitudinal axis.

29. The strainer member of claim 24, wherein the fluid inlet opening is formed about a central axis; and
wherein the top surface is angled downwardly towards the bottom end at an angle from about 45° to about 60° relative to the central axis.

30. The strainer member of claim 29, wherein the elongated wall is formed about a central longitudinal axis; and
wherein the central longitudinal axis is substantially perpendicular to the central axis of the fluid inlet opening.

31. The strainer member of claim 24, wherein the top surface is configured and dimensioned to re-direct at least a portion of incoming fluid flow through the fluid inlet opening toward the top end.

32. The strainer member of claim 24, wherein the protruding surface extends inwardly into the chamber from a position at or near the bottom end to a position between the bottom end and the top end.

33. The strainer member of claim 24, wherein the elongated surface includes a front side and a rear side;
wherein the fluid inlet opening is positioned on the front side; and
wherein the protruding surface is positioned on the rear side.

34. The strainer member of claim 24, wherein the protruding surface curves inwardly into the chamber from the right and left sides in an arc-like manner to define an inward curved surface that is partially substantially cylindrical.

35. The strainer member of claim 24, wherein the top surface is substantially solid.

36. A strainer member for use with a fluid circulation system, comprising:
an elongated wall that extends from a top end to a bottom end;
an end wall at the bottom end, the elongated wall and the end wall defining a chamber therewithin and having a top side opening at the top end;
a plurality of apertures that extend through the elongated wall and the end wall;
a fluid inlet opening that extends through the elongated wall;
a protruding surface having a right side and a left side, the protruding surface extending inwardly into the chamber from the right and left sides;
wherein the right and left sides of the protruding surface each define a curved internal recess within the chamber;
wherein the protruding surface curves inwardly into the chamber from the right and left sides in an arc-like manner to define an inward curved surface that is partially substantially cylindrical;
wherein each curved internal recess is configured and dimensioned to substantially prevent debris from blocking at least a portion of apertures that extend through the protruding surface;
wherein the protruding surface includes a top surface that extends: (i) inwardly into the chamber, and (ii) downwardly towards the bottom end of the chamber;
wherein the top surface is substantially continuous or solid; and
wherein the top surface is configured and dimensioned to re-direct at least a portion of incoming fluid flow through the fluid inlet opening toward the top end.

37. The strainer member of claim 36, wherein the top surface is substantially solid.

* * * * *